United States Patent
Miao et al.

(10) Patent No.: US 12,498,215 B2
(45) Date of Patent: Dec. 16, 2025

(54) CALCULATION METHOD FOR MEASURING FLATNESS OF CROSS-SECTION OF TUNNEL SEGMENT BASED ON SPATIAL POINT-TO-PLANE RELATION

(71) Applicant: CCCC NATIONAL ENGINEERING RESEARCH CENTER OF DREDGING TECHNOLOGY AND EQUIPMENT CO., LTD., Shanghai (CN)

(72) Inventors: Yuanquan Miao, Shanghai (CN); Weihao Song, Shanghai (CN); Hongsheng Zhang, Shanghai (CN); Qing Xu, Shanghai (CN); Jingdun Pang, Shanghai (CN); Yanxing He, Shanghai (CN); Yi Wu, Shanghai (CN); Jiandong Zhou, Shanghai (CN)

(73) Assignee: CCCC NATIONAL ENGINEERING RESEARCH CENTER OF DREDGING TECHNOLOGY AND EQUIPMENT CO., LTD., Shanghai (CN)

( * ) Notice: Subject to any disclaimer, the term of this patent is extended or adjusted under 35 U.S.C. 154(b) by 0 days.

(21) Appl. No.: 18/862,741

(22) PCT Filed: Jun. 16, 2022

(86) PCT No.: PCT/CN2022/099164
§ 371 (c)(1),
(2) Date: Nov. 4, 2024

(87) PCT Pub. No.: WO2022/262809
PCT Pub. Date: Dec. 22, 2022

(65) Prior Publication Data
US 2025/0164236 A1 May 22, 2025

(30) Foreign Application Priority Data
Jun. 17, 2021 (CN) .......................... 202110670360.2

(51) Int. Cl.
*G01B 11/24* (2006.01)
(52) U.S. Cl.
CPC .................................... *G01B 11/24* (2013.01)
(58) Field of Classification Search
CPC .......... G01B 11/24; G01B 11/02; G01B 5/20; E02D 29/045; E02D 29/10; E02D 17/00
See application file for complete search history.

(56) References Cited

U.S. PATENT DOCUMENTS

2013/0231892 A1* 9/2013 Franke .................. G01B 11/24
702/170

FOREIGN PATENT DOCUMENTS

CN     101387494 A     3/2009
CN     106066177 A * 11/2016 ............. G01C 25/00
(Continued)

OTHER PUBLICATIONS

Jie et al. (Near real-time circular tunnel shield segment assembly quality inspection using pint cloud data: A case study. Tunnelling and Underground Space Technology 91 (2019) 102998) (Year: 2019).*

(Continued)

*Primary Examiner* — Catherine T. Rastovski
*Assistant Examiner* — Sharad Timilsina
(74) *Attorney, Agent, or Firm* — Hawaii Patent Services; Nathaniel K. Fedde; Kenton N. Fedde

(57) ABSTRACT

A calculation method for measuring the flatness of cross-section of a tunnel segment, comprising: mounting laser displacement sensors on a thrust cylinder assembly plane of a tunnel boring machine, an emitting laser beam of each sensor being parallel to an axis of a cylinder, being perpendicular to the propulsion cylinder assembly plane, and pointing to the end surface of a segment ring to be tested; the intersection of the straight line where the laser of each laser displacement sensor is located and the propulsion cylinder assembly plane is referred to as a base point $P_i$; the intersection formed between the laser of each laser displacement (Continued)

sensor and said segment ring is referred to as a measurement point $P_i'$; the corresponding spatial coordinates of each base point are represented by $P_i(x_i,y_i,z_i)$; the corresponding spatial coordinates of each measurement point are represented by $P_i'(x_i',y_i',z_i')$; a rear shield axis vector $n_{rear\ shield}=(x_n,y_n,z_n)$.

1 Claim, 2 Drawing Sheets

(56) References Cited

FOREIGN PATENT DOCUMENTS

| CN | 110196016 | A | | 9/2019 |
| CN | 111854715 | A | | 10/2020 |
| CN | 211783341 | A | | 10/2020 |
| CN | 112161614 | A | | 1/2021 |
| CN | 112325809 | A | * | 2/2021 | ............. G01B 11/30 |
| CN | 113251956 | A | | 8/2021 |
| CN | 113251957 | A | | 8/2021 |
| JP | 2018132425 | A | | 8/2018 |

OTHER PUBLICATIONS

Jie et al. (Near real-time circular tunnel shield segment assembly quality inspection using point cloud data: A case study. Tunneling and underground space technology 91 92019) 102998 (Year: 2019).*
Jie Xu et al. Near real-time circular tunnel shield segment assembly quality inspection using point cloud data: A case study Tunnelling and Underground Space Technology, vol. 91, Jun. 21, 2019 (Jun. 21, 2019), ISSN: 0886-7798, (entire document).

* cited by examiner

CALCULATION METHOD FOR MEASURING FLATNESS OF CROSS-SECTION OF TUNNEL SEGMENT BASED ON SPATIAL POINT-TO-PLANE RELATION

TECHNICAL FIELD

The present invention relates to the technical field of tunnel construction, specifically to flatness measurement of cross-section of tunnel segment.

BACKGROUND TECHNOLOGY

Rapidly increasing population in cities places a growing demand on public transportation networks represented by underground rails. Due to its reliable safety, efficiency and cost-effective performance, tunneling shields are widely used in engineering fields such as undergrounds and tunnels. For tunneling construction, multi-ring connected general-purpose wedge-shaped tunnel segments are used as the innermost supporting structures, in order to fit the axial line according to the tunnel design, depending on the construction requirements, assembly sites are to be selected rationally to adjust the amount, shapes and positions of the tunnel segments. During tunneling construction, tunnel segments are installed every after boring for a distance of a ring, after installation for the instant ring, the tunneling shield will bore the next ring, until completion of tunneling.

Thrust cylinders are provided cylindrically along the shield of the tunneling shield, grippers of the thrust cylinders are supported by the cross sections of the tunnel segments at the foremost, and forward digging thrust force is provided for the tunneling shield by extending the piston shaft gently. The tunnel segments in the same ring are assembled from a plurality of prefabricated pipe sections, in case that, during assembly of the current ring, due to selection of the assembly site, tunnel segment assembly status and gestures of the tunneling shield, the cross section of the tunnel segments is not flat, consequently, after assembly the next ring and continuing boring, local pressure in where the two rings contact each other is too high, the concrete tunnel segments are damaged as a result, the engineering quality and construction safety will be deteriorated.

In order to avoid a series of adverse effects due to the poor flatness of the assembled tunnel segments, it is necessary to measure deviations of distances between each measuring point to a calibration plane for the tunnel segments, so as to compensate manually the deviations of the distances from the measuring points and to close the measuring points to the calibration plane. Currently, the commonly used method for measuring the flatness of the tunnel segments are: manually measuring coordinates of the measuring points on the cross sections of the front portion of the current ring with a total station, selecting three of the measuring points to calculate a target plane empirically, and calculating the distance from the measuring points to the plane as the deviations from the measuring point to the target plane.

The manual measurement method as set forth in the foregoing paragraphs has some defects: 1. the arbitrariness of the three points is high, making it difficult to promise that the target plant calculated based on the three points is the optimum target plane without scientific and reasonable theoretical supports. 2. With this method, the coordinates of the points are to be measured with a total station, in view of spatial limitations of tunneling construction, it is difficult to measure manually, the operation is not convenient and measuring efficiency and timeliness is poor, which goes against the timeliness requirements of tunneling construction.

SUMMARY OF INVENTION

In view of the foregoing problems, the present invention discloses for the first time a calculation method of flatness of cross-section of tunnel segment based on spatial point-plane relation, by which, highly efficient and accurate measurement of flatness of the tunnel segment can be measured and the present method has good application prospect in being used for automatic measurement method or system of flatness of cross-sections of tunnel segment.

The technical solution to be claimed: a calculation method of flatness of cross-section of tunnel segment based on spatial point-plane relation, comprising:

Installation: installing at least one laser displacement sensor on an assembly plane of at least one thrust cylinder of a tunneling shield, with the at least one laser displacement sensor emitting laser beams parallel to an axial line of the at least one thrust cylinder and perpendicular to the assembly plane of the at least one thrust cylinder and orienting to an end surface of a tunnel ring to be measured;

Assuming: intersections between laser lines of the at least one laser displacement sensor and the assembly plane of the at least one thrust cylinder are base points $P_i$, intersections with the end surface of the tunnel ring to be measured are measuring points $P_i'$; spatial coordinates corresponding to each of the base points are represented by $P_i(x_i,y_i,z_i)$; spatial coordinates corresponding to each of the measuring points are represented by $P_i'(x_i',y_i',z_i')$; an axial vector of the shield $n_{rear\ shield} + (x_n, y_n, z_n)$;

Treating: fitting for the first time an acquired plane as a reference plane, represented by $\alpha_0$; translating the reference plane $\alpha_0$ until a calibration position and obtain a calibration plane, shown as $\alpha_1$; showing distances from the measuring points to the reference plane $\alpha_0$ as $\Delta d_i$, and distances from the measuring points to the calibration plane $\alpha_1$ as $d_i$.

EMBODIMENTS

Figure 1:
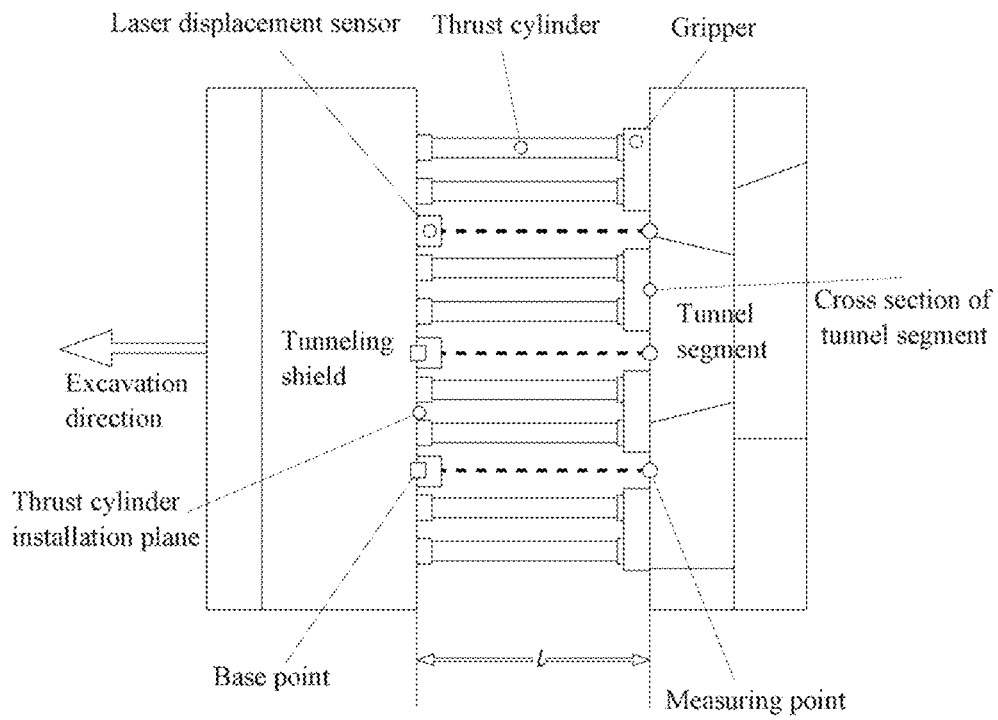
FIG. 1 shows an application condition and relative positions of base points and measuring points.
Figure 2:
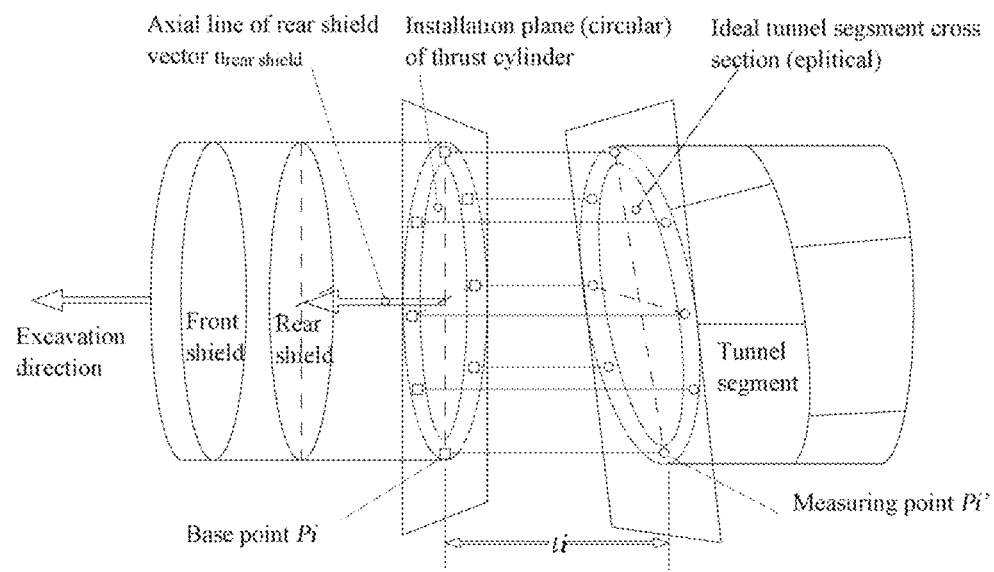
FIG. 2 shows the measuring points obtained using axial vector of the shield.

Hereinafter a brief description will be given to the present invention in conjunction with the drawings.

I. Theoretical Supports:

Assuming center points of projected areas of at least one laser displacement sensor at an assembly plane at a shield tail base points and naming intersections between laser lines emitted by at least one laser displacement sensor and a cross-section of a tunnel segment measuring points. Spatial coordinates corresponding to each of the base points are shown as $P_i(x_i,y_i,z_i)$; spatial coordinates of each of the measuring points are shown as $P_i'(x_i',y_i',z_i')$; a plane obtained by a first fitting is called a reference plane, shown as $\alpha_0$; a plane obtained by translating the reference plane $\alpha_0$ to a plane of a calibration position is called a calibration plane, shown as $\alpha_1$; distances from the base points to the reference plane $\alpha_0$ are shown as $\Delta d_i$ and distances from the base points and the calibration plane $\alpha_1$ are shown as $d_i$.

(1) Obtaining an axial vector $n_{rear\ shield}=(x_n,y_n,z_n)$ from a programmable logic controller (PLC), coordinates $P_i(x_i, y_i, z_i)$ of root portions of the thrust cylinders and distances $l_i$ from the base points to the measuring points of the laser displacement sensor.

(2) $n_{rear\ shield}$ is a normal vector of a circular plane that the base points corresponding to the laser displacement sensor are located in, as vectors formed by lasers emitted by the laser displacement sensor are parallel to the normal vector $n_{rear\ shield}$ and the distances from the base points to the measuring points are $l_i$, on this basis, an equation is obtained and coordinates of the measuring points $P_i'(x_i',y_i',z_i')$ are solved:

$$\begin{cases} x_i' = \dfrac{l_i \cdot x_n}{\sqrt{x_n^2+y_n^2+z_n^2}} + x_i \\ y_i' = \dfrac{l_i \cdot y_n}{\sqrt{x_n^2+y_n^2+z_n^2}} + y_i \\ z_i' = \dfrac{l_i \cdot z_n}{\sqrt{x_n^2+y_n^2+z_n^2}} + z_i \end{cases}$$

(3) In an ideal case, the coordinates of the measuring points are located in the same plane, and a mathematical model showing distribution of the measuring points can be shown as a planar equation.

In a three-dimensional space, by fitting and calculating parameters of the reference planar equation by linear regression or SVD decomposition methods based on coordinates of the measuring points, an equation of the reference plane $\alpha_0$ can be obtained, taking as an example the least square, the planar equation can be shown as $$\begin{cases} Ax+By+Cz+1=0 \\ \begin{bmatrix} A \\ B \\ C \end{bmatrix} = \left( \begin{bmatrix} x_1' & y_1' & z_1' \\ \vdots & \vdots & \vdots \\ x_n' & y_n' & z_n' \end{bmatrix}^T \begin{bmatrix} x_1' & y_1' & z_1' \\ \vdots & \vdots & \vdots \\ x_n' & y_n' & z_n' \end{bmatrix} \right)^{-1} \begin{bmatrix} x_1' & y_1' & z_1' \\ \vdots & \vdots & \vdots \\ x_n' & y_n' & z_n' \end{bmatrix}^T \begin{bmatrix} -1 \\ \vdots \\ -1 \end{bmatrix} \end{cases}$$

(4) The normal vectors of the reference plane $\alpha_0$ are $n_{reference\ plane}=(A,B,C)$, and a dot product of the normal vector $n_{rear\ shield}$ of the cross section at the tail end portion of the shield is $dot_0=n_{reference\ plane} \cdot n_{rear\ shield}$. Selecting arbitrarily a point $P'(x_0',y_0',z_0')$ in a plane, obtaining vectors of the point orienting to the measuring points $\vec{P'P_i'}=(x_i'-x_0',y_i'-y_0',z_i'-z_0')$, calculating the dot product $dot_1=n_{reference\ plane} \cdot \vec{P'P_i'}$, where $dot_0 \cdot dot_1 > 0$, the measuring points $P_i(x_i,y_i,z_i)$ are located at a side along the excavation direction. And with this method, all the measuring points at the side along the excavation direction of the reference plane $\alpha_0$ can be found.

(5) Calculating distances $$\Delta d_k = \dfrac{|Ax_k+By_k+Cz_k+1|}{\sqrt{A^2+B^2+C^2}}$$

from the measuring points at a side along the excavation direction and the reference plane, and selecting coordinates of the measuring point corresponding to the maximum distance $P_{max}(x_{max},y_{max},z_{max})$.

(6) Translating the reference plane along the excavation direction of the tunneling shield until passing the point $P_{max}(x_{max},y_{max},z_{max})$, the plane obtained is the calibration plane $\alpha_1$ and the equation is:

$$Ax+By+Cz-(Ax_{max}+By_{max}+Cz_{max})=0$$

(7) Calculating the distances from the measuring points to the calibration plane with the following equation, and obtaining distance deviations from the measuring points along the cross section at the front portion of the tunnel segment to the calibration plane $\alpha_1$:

$$di = \dfrac{|Ax_i+By_i+Cz_i-(Ax_{max}+By_{max}+Cz_{max})|}{\sqrt{A^2+B^2+C^2}}$$

Figure 3:
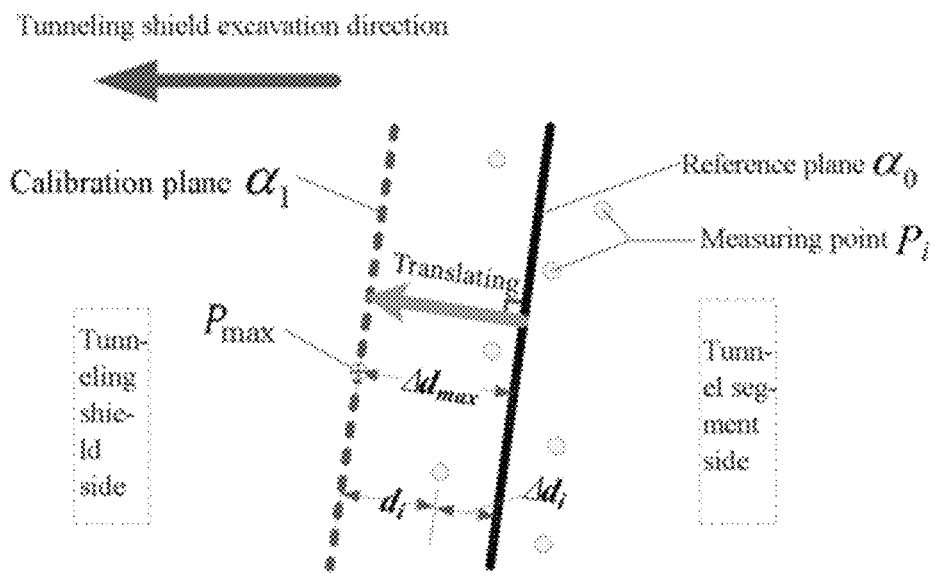
FIG. 3 shows solving the calibration plane (top view).

The calculation principle is as shown in FIG. 3: conducting data fitting according to the coordinates of the measuring points in the three-dimensional spatial rectangular coordinate system and obtaining the reference plane $\alpha_0$ (solid lines in the figures). To promise that all the measuring points are located at a side of the tunnel segment of the calibration plane to facilitate subsequent deviation compensation, the measuring point at the side along the excavation direction of the reference plane $\alpha_0$ and that is the farthest from the reference plane $\alpha_0$ is selected, translating the reference plane $\alpha_0$ along the excavation direction of the tunneling shield until passing the point at the farthest, and the plane obtained at this time corresponds to the calibration plane $\alpha_1$ (dotted lines in the figures). Calculating the distances from the measuring points to the calibration plane $\alpha_1$ and obtaining the deviations of the measuring points relative to the calibration plane $\alpha_1$ in the three-dimensional space.

II. Application Instances

Hereinafter a further description will be given to the embodiments and the technical principles of the present invention in conjunction with the drawings.

The calculation method of flatness of tunnel segment can be realized by an automatic guiding system based on the tunneling shield and an automatic distance measurement system for measuring distances between the assembly plane of the at least one thrust cylinder and the end surface of the tunnel segment.

Wherein, the automatic guiding system for the tunneling shield is a mature product, and provides only corresponding spatial position data to the automatic distance measuring system. The automatic guiding system is a gesture measuring system inherent in the tunneling shield, in the system, spatial coordinates for a shield head, a hinging portion and a shield tail are present, the laser displacement sensors are fixed at the rear shield of the tunneling shield, therefore, the base points $P_i$ corresponding to the laser displacement sensors and relative spatial relationships with the hinging portion and the shield tail of the tunneling shield are fixed; as per the relative spatial relationships, the automatic guiding system can calculate the spatial coordinates $P_i(x_i,y_i,z_i)$ of the base points $P_i$. Therefore, the automatic guiding system in the present invention can provide axial spatial vectors of the rear shield of the tunneling shield $n_{shield}=(x_n,y_n,z_n)$ and the installation positions of the laser displacement sensors (the coordinates of the base points $P_i(x_i,y_i,z_i)$) and transmitting to the PLC of the automatic measuring system of the tunneling shield.

Wherein the automatic distance measuring system for distances between the assembly plane of the thrust cylinder and the end surface of the tunnel segment comprises at least one laser displacement sensor, at least one programmable logic controller (PLC) and at least one industrial computer. The at least one laser displacement sensor is installed at a circumference centered on a center of the installation plane of the thrust cylinder, for measuring the distances from the base points at the shield tail of the tunneling shield and the measuring points of the corresponding tunnel segment; the at least one PLC is configured to convert the analog quantitative signals of the sensors to be digital signals, and transmit to the at least one industrial computer; the at least one industrial computer is configured to treat the data and calculate deviations of distances from the measuring points to the calibration plane.

The host computer writes in C#/C++/Python languages, and the AD conversion of the slave computer is realized by the PLC inherent in the tunneling shield. Acquiring the distance data with the laser displacement sensor; the PLC serves as a data conversion unit and a gesture data transit station, uploading the spatial position information and distance data to the host computer and providing tunneling status information for the host computer; and the host computer judges the status of the tunneling shield according to the PLC and solves the deviations between the measuring points of the tunnel segment and the calibration plane.

The invention claimed is:

1. A method for measuring flatness of cross-section of a tunnel segment based on spatial point-plane relation, wherein the method for measuring of flatness of a tunnel segment is carried out by an automatic guiding system based on a tunneling shield and an automatic distance measurement system for measuring distances between an assembly plane of at least one thrust cylinder of the tunneling shield and an end surface of the tunnel segment;

wherein the automatic distance measuring system for distances between the assembly plane of the thrust cylinder and the end surface of the tunnel segment comprises at least one laser displacement sensor, at least one programmable logic controller (PLC) and at least one industrial computer; the at least one laser displacement sensor is installed at a circumference centered on a center of an installation plane of the thrust cylinder, for measuring the distances from base points $P_i$ at a shield tail of the tunneling shield and measuring points $P_i'$ of the corresponding tunnel segment; the at least one PLC is configured to convert analog quantitative signals of the sensors to be digital signals, and transmit to the at least one industrial computer; the at least one industrial computer is configured to treat data from the at least one laser displacement sensor and calculate deviations of distances from the measuring points to a calibration plane;

wherein, the automatic guiding system for the tunneling shield provides only corresponding spatial position data to the automatic distance measuring system; the automatic guiding system is a gesture measuring system in the tunneling shield; in the system, spatial coordinates for a shield head, a hinging portion and a shield tail are present, the laser displacement sensors are fixed at a rear shield of the tunneling shield, such that, the base points $P_i$ corresponding to the laser displacement sensors and relative spatial relationships with the hinging portion and the shield tail of the tunneling shield are fixed; as per the relative spatial relationships, the automatic guiding system can calculate the spatial coordinates $P_i(x_i, y_i, z_i)$ of the base points $P_i$; whereby, the automatic guiding system can provide axial spatial vectors of the rear shield of the tunneling shield $n_{shield}=(x_n, y_n, z_n)$ and the installation positions of the laser displacement sensors (the coordinates of the base points $P_i(x_i, y_i, z_i)$) and transmit to the PLC of the automatic measuring system of the tunneling shield;

wherein the flatness measuring method of a tunnel segment comprises:

installing the at least one laser displacement sensor on the assembly plane of at least one thrust cylinder of the tunneling shield, with the at least one laser displacement sensor emitting laser beams parallel to an axial line of the at least one thrust cylinder and perpendicular to the assembly plane of the at least one thrust cylinder and orienting to an end surface of a tunnel ring to be measured;

intersections between laser lines of the at least one laser displacement sensor and the assembly plane of the at least one thrust cylinder are the base points $P_i$, intersections with the end surface of the tunnel ring to be measured are the measuring points $P_i'$; spatial coordinates corresponding to each of the base points are represented by $P_i(x_i, y_i, z_i)$; spatial coordinates corresponding to each of the measuring points are represented by $P_i'\mathbf{40}$ ($x_i'$, $y_i'$, $z_i'$); an axial vector of the shield $n_{rear\ shield}=(x_n, y_n, z_n)$;

fitting for the first time an acquired plane as a reference plane, represented by $\alpha_0$; translating the reference plane $\alpha_0$ until a calibration position and obtain a calibration plane, shown as $\alpha_1$; showing distances from the measuring points to the reference plane $\alpha_0$ as $\Delta d_i$, and distances from the measuring points to the calibration plane $\alpha_1$ as $d_i$;

wherein (1) $n_{rear\ shield}$ is a normal vector of a circular plane that the base points corresponding to the laser displacement sensor are located in, as vectors formed by lasers emitted by the laser displacement sensor are parallel to the normal vector $n_{rear\ shield}$ and the distances from the base points to the measuring points are $l_i$, on this basis, an equation is obtained and coordinates of the measuring points $P_i'(x_i', y_i', z_i')$ are solved:

$$\begin{cases} x_i' = \dfrac{l_i \cdot x_n}{\sqrt{x_n^2 + y_n^2 + z_n^2}} + x_i \\ y_i' = \dfrac{l_i \cdot y_n}{\sqrt{x_n^2 + y_n^2 + z_n^2}} + y_i \\ z_i' = \dfrac{l_i \cdot z_n}{\sqrt{x_n^2 + y_n^2 + z_n^2}} + z_i \end{cases}.$$

(2) the coordinates of the measuring points are located in the same plane, and a mathematical model showing distribution of the measuring points can be shown as a planar equation;

in a three-dimensional space, by fitting and calculating parameters of the reference planar equation by linear regression or singular value decomposition (SVD) decomposition methods based on coordinates of the measuring points, an equation of the reference plane $\alpha_0$ is obtained, calculating using the least squares method, the planar equation is shown as $$\begin{cases} Ax + By + Cz + 1 = 0 \\ \begin{bmatrix} A \\ B \\ C \end{bmatrix} = \left( \begin{bmatrix} x'_1 & y'_1 & z'_1 \\ \vdots & \vdots & \vdots \\ x'_n & y'_n & z'_n \end{bmatrix}^T \begin{bmatrix} x'_1 & y'_1 & z'_1 \\ \vdots & \vdots & \vdots \\ x'_n & y'_n & z'_n \end{bmatrix} \right)^{-1} \begin{bmatrix} x'_1 & y'_1 & z'_1 \\ \vdots & \vdots & \vdots \\ x'_n & y'_n & z'_n \end{bmatrix}^T \begin{bmatrix} -1 \\ \vdots \\ -1 \end{bmatrix} \end{cases}$$

(3) the normal vectors of the reference plane $\alpha_0$ are $n_{reference\ plane}=(A, B, C)$, and a dot product of the normal vector $n_{rear\ shield}$ of the cross section at the tail end portion of the shield is $dot_0 = n_{reference\ plane} \cdot n_{rear\ shield}$; selecting arbitrarily a point $P'(x_0', y_0', z_0')$ in the reference plane, obtaining vectors of the point orienting to the measuring points $\overrightarrow{P'P_i'} = (x_i' - x_0', y_i' - y_0', z_i' - z_0')$, calculating the dot product $dot_1 = n_{reference\ plane} \cdot \overrightarrow{P'P_i'}$, where $dot_0 \cdot dot_1 > 0$, the measuring points $P_i(x_i, y_i, z_i)$ are located at a side along an excavation direction; and with this method, all the measuring points at the side along the excavation direction of the reference plane $\alpha_0$ can be found;

(4) calculating distances $$\Delta d_k = \frac{|Ax_k + By_k + Cz_k + 1|}{\sqrt{A^2 + B^2 + C^2}}$$

from the measuring points at a side along the excavation direction and the reference plane, and selecting coordinates of the measuring point corresponding to the maximum distance $P_{max}(x_{max}, y_{max}, z_{max})$;

(5) translating the reference plane along the excavation direction of the tunneling shield until passing the point $P_{max}(x_{max}, y_{max}, z_{max})$, the plane obtained is the calibration plane $\alpha_1$ and the equation is:

$$Ax + By + Cz - (Ax_{max} + By_{max} + Cz_{max}) = 0;$$

(6) calculating the distances from the measuring points to the calibration plane with the following equation, and obtaining distance deviations from the measuring points along the cross section at a front portion of the tunnel segment to the calibration plane $\alpha_1$:

$$d_i = \frac{|Ax_i + By_i + Cz_i - (Ax_{max} + By_{max} + Cz_{max})|}{\sqrt{A^2 + B^2 + C^2}}.$$

* * * * *